United States Patent
Cheng et al.

(10) Patent No.: US 7,990,486 B2
(45) Date of Patent: Aug. 2, 2011

(54) LIQUID CRYSTAL DISPLAY PANEL WITH LINE DEFECT REPAIRING MECHANISM AND REPAIRING METHOD THEREOF

(75) Inventors: Sheng-Hsien Cheng, Miao-Li (TW); Chien-Ting Lai, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 697 days.

(21) Appl. No.: 12/001,578

(22) Filed: Dec. 11, 2007

(65) Prior Publication Data

US 2008/0174713 A1 Jul. 24, 2008

(30) Foreign Application Priority Data

Dec. 11, 2006 (TW) ................................ 95146239 A

(51) Int. Cl.
*G02F 1/1333* (2006.01)
*G02F 1/13* (2006.01)
(52) U.S. Cl. .......................................... 349/54; 349/192
(58) Field of Classification Search .............. 349/54–55, 349/190, 192
See application file for complete search history.

(56) References Cited

U.S. PATENT DOCUMENTS

| 5,859,679 | A | 1/1999 | Song |
| 6,476,882 | B1* | 11/2002 | Sakurai ........................... 349/55 |
| 6,614,494 | B2* | 9/2003 | Kawai et al. .................... 349/54 |
| 6,642,973 | B2* | 11/2003 | Cheng et al. .................... 349/55 |
| 7,106,391 | B2* | 9/2006 | Song ................................ 349/44 |
| 2002/0118316 | A1 | 8/2002 | Yang |
| 2004/0012727 | A1 | 1/2004 | Kim et al. |

FOREIGN PATENT DOCUMENTS

TW 507189 B 10/2002

* cited by examiner

*Primary Examiner* — Dung T. Nguyen
(74) *Attorney, Agent, or Firm* — Wei Te Chung

(57) ABSTRACT

An exemplary liquid crystal display panel (2) includes a plurality of gate lines (21), a plurality of data lines (22), a plurality of pixel regions, and a plurality of repair lines (24). Each pixel region is surrounded by two corresponding gate lines and two corresponding data lines, and each pixel region includes a pixel electrode (20). Each repair line is provided at a respective one of the pixel regions. Each repair line is a substantially rectangular-shaped ring, two opposite long sides of the ring are located at two opposite sides of a corresponding data line or a corresponding gate line between two corresponding adjacent pixel electrodes, two opposite short sides of the ring cross the corresponding data line or gate line, and the repair line is electrically isolated from the corresponding data line or gate line. A method for repairing the liquid crystal display panel is also provided.

15 Claims, 5 Drawing Sheets

LIQUID CRYSTAL DISPLAY PANEL WITH LINE DEFECT REPAIRING MECHANISM AND REPAIRING METHOD THEREOF

FIELD OF THE INVENTION

The present invention relates to a liquid crystal display (LCD) panel having a line defect repairing configuration, and to a method for repairing line defects in wiring patterns of an LCD panel.

BACKGROUND

LCD devices are commonly used as displays for compact electronic apparatuses. This is not only because they provide good quality images with little power consumption, but also because they are very thin. A typical LCD device includes an LCD panel. In a display region of the LCD panel, an array of pixel regions is defined by horizontal gate lines and vertical data lines. Each pixel region has a thin film transistor (TFT) and a pixel electrode. The TFT serves as a switching element. The gate lines and the data lines transmit image signals to all the TFTs in order to drive the pixel electrodes.

In the course of manufacturing an LCD panel, breaks are liable to occur in the wiring patterns of the LCD panel, such as in the gate lines and the data lines. If the regions of the LCD panel where these lines are formed are not smooth, then open circuits or short circuits are liable to be created during processes such as heat treatment or etching. Further, many modern LCD panels are large-sized, and/or provide high resolution. Such LCD panels have large numbers of data lines and gate lines, and/or a narrower line width of the lines. This can make fabrication of the LCD panel more difficult, and/or increase the risk of breaks occurring in the wiring patterns. Accordingly, some LCD panels are provided with a line defect repairing configuration. If a defect in the wiring patterns occurs and is detected, an appropriate method for repairing the defect can be carried out.

FIG. 5 is a schematic, top plan view of a conventional LCD panel 1, showing line defect repairing thereof. The LCD panel 1 includes a plurality of horizontal gate lines 11 and a plurality of vertical data lines 12. The gate lines 11 and the data lines 12 form a pixel array 10, which has a plurality of rectangular pixel regions 15. A plurality of parallel U-shaped repair lines 16 is formed outside of the pixel array 10. The repair lines 16 cross front ends and tail ends of the data lines 12.

In operation, if one of the data lines 121 breaks at point A, image signals that should pass through the broken data line 121 are blocked. One of the repair lines 161 intersecting the broken data line 121 can be selected. Then the broken data line 121 and the repair line 161 can be connected at their two points of intersection (not labeled) by laser fusing or other known techniques. Moreover, spare portions of the repair line 161 can be cut off from the functioning portions of the repair line 161, as shown. Thereby, image signals can pass through the repair line 161 to reach the portions of the data line 121 cut off by the break at point A.

However, the repair line 161 is lengthy, and has inherent resistance and capacitance. A large delay in the image signals may occur due to the resistance and capacitance. This in turn may reduce the quality of images displayed by the LCD panel 1. In addition, ideally, each data line 12 has a corresponding repair line 16. However, the repair lines 16 add to the size of the LCD panel 1. Therefore in practice the number of repair lines 16 is limited.

What is needed, therefore, is an LCD panel that can overcome the above-described deficiencies. What is also needed is a method for repairing an LCD panel which can overcome the above-described deficiencies.

SUMMARY

An LCD panel is provided. The LCD panel includes a plurality of gate lines that are parallel to each other, a plurality of data lines that are parallel to each other and cross the gate lines, a plurality of pixel regions, and a plurality of repair lines. Each pixel region is surrounded by two corresponding gate lines and two corresponding data lines, and each pixel region includes a pixel electrode. Each repair line is provided at a respective one of the pixel regions. Each repair line is a substantially rectangular-shaped ring, two opposite long sides of the ring are located at two opposite sides of a corresponding data line or a corresponding gate line between two corresponding adjacent pixel electrodes, two opposite short sides of the ring cross the corresponding data line or gate line, and the repair line is electrically isolated from the corresponding data line or gate line.

A repairing method for an LCD panel is also provided. The LCD panel includes a plurality of gate lines that are parallel to each other, a plurality of data lines that are parallel to each other, a plurality of pixel regions surrounded by the crossed gate lines and data lines, and a plurality of repair line. Each pixel region includes a pixel electrode. Each repair line is provided at a respective one of the pixel regions. Each repair line is a substantially rectangular-shaped ring, two opposite long sides of the ring are located at two opposite sides of a corresponding data line or a corresponding gate line between two corresponding adjacent pixel electrodes, two opposite short sides of the ring cross the corresponding data line or gate line, and the repair line is electrically isolated from the corresponding data line or gate line. The repairing method includes: providing the LCD panel; inspecting the LCD panel; in the event of a defect being detected in a data line or gate line, selecting a repair line adjacent to the data line or gate line; electrically connecting the data line or gate line and the repair line at two positions where the data line or gate line crosses the repair line.

Other novel features and advantages will become more apparent from the following detailed description when taken in conjunction with the accompanying drawings.

BRIEF DESCRIPTION OF THE DRAWINGS

The emphasis in the drawings is placed upon clearly illustrating the principles of various embodiments of the present invention. Like reference numerals designate corresponding parts throughout various drawings, and all the views are schematic.

DETAILED DESCRIPTION OF PREFERRED EMBODIMENTS

Reference will now be made to the drawings to describe preferred embodiments of the present invention in detail.

Figure 1:
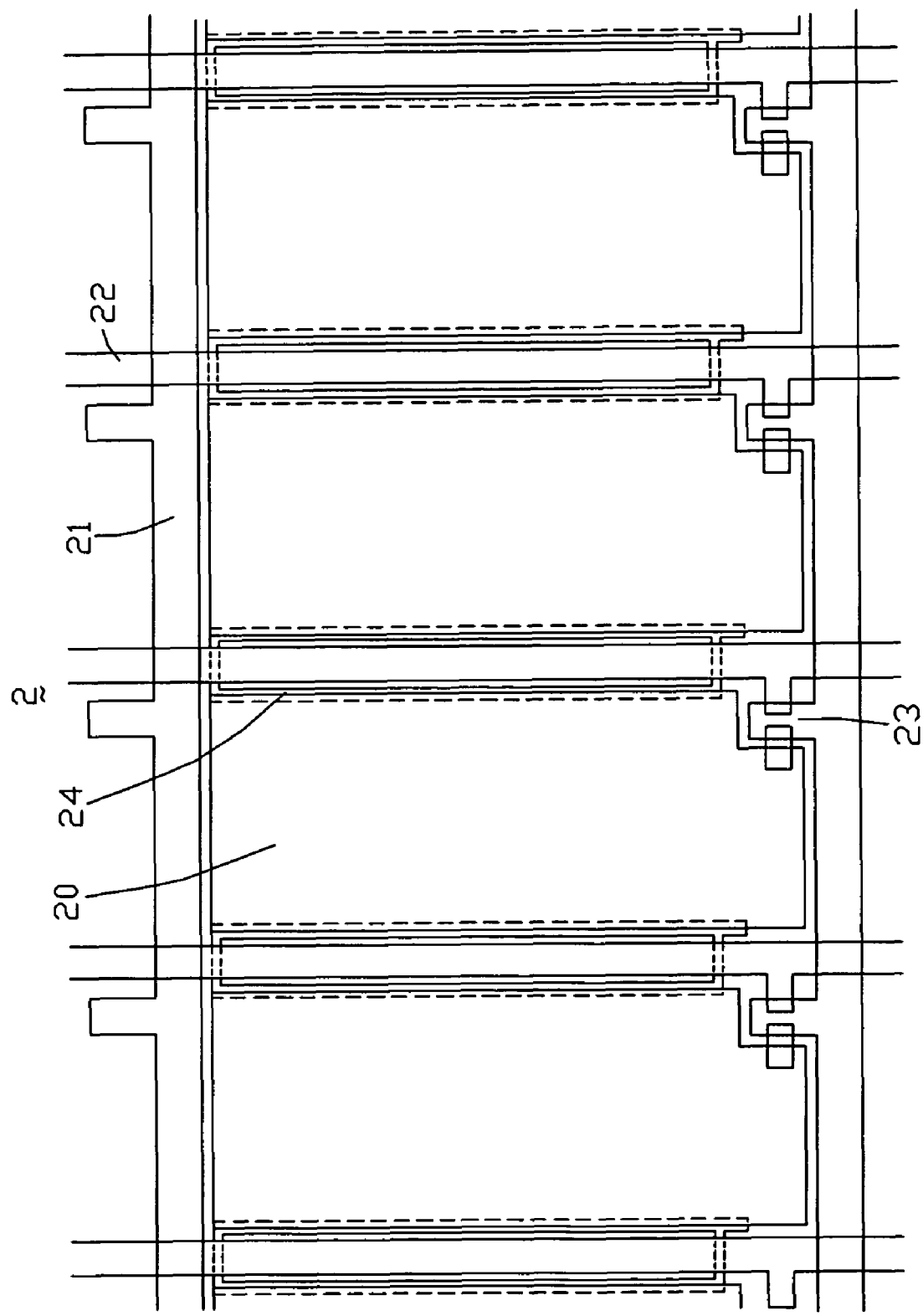
FIG. 1 is a schematic, top plan view of part of an LCD panel according to a first embodiment of the present invention, the LCD panel having a line defect repairing configuration.

Referring to FIG. 1, part of an LCD panel 2 according to a first embodiment of the present invention is shown. The LCD panel 2 includes a plurality of gate lines 21 that are parallel to each other, a plurality of data lines 22 that are parallel to each other and that cross the gate lines 21, and a plurality of rectangular pixel regions (not labeled) each surrounded by respective pairs of crossing gate lines 21 and data lines 22. Each pixel region includes a TFT 23 and a pixel electrode 20.

The LCD panel 2 includes a line defect repairing configuration; in particular, a plurality of repair lines 24. Each of the repair lines 24 is electrically conductive and electrically isolated from each other. Each repair line 24 is a substantially rectangular-shaped ring and surrounds part of a corresponding data line 22 between two horizontally adjacent pixel electrodes 20, and crosses the corresponding data line 22 at two positions (not labeled) of the repair line 24. One position is adjacent to a corresponding gate line 21, and the other is adjacent to a source electrode (not labeled) of the corresponding TFT 23 connected to the corresponding data line 22. Each repair line 24 includes two opposite long sides (not labeled) disposed at two sides of the data line 22, and the two opposite long sides may partly overlap edges of the two horizontally adjacent pixel electrodes 20, respectively. The repair lines 24 and the data lines 22 are formed on different planes, and an insulating layer is formed therebetween. The repair line 22 and the two horizontally adjacent pixel electrodes 20 are also formed on different planes, and an insulating layer is also is formed therebetween. Thus, the repair lines 24 are electrically isolated from the data lines 22 and also the pixel electrodes 20. The repair lines 24 may be shielding metal lines, and may be formed with the gate lines 21 via patterning a same metal layer. Therefore, the repair lines 24 are not only used for repairing the broken data lines 22, but also used to prevent light leakage.

Figure 2:
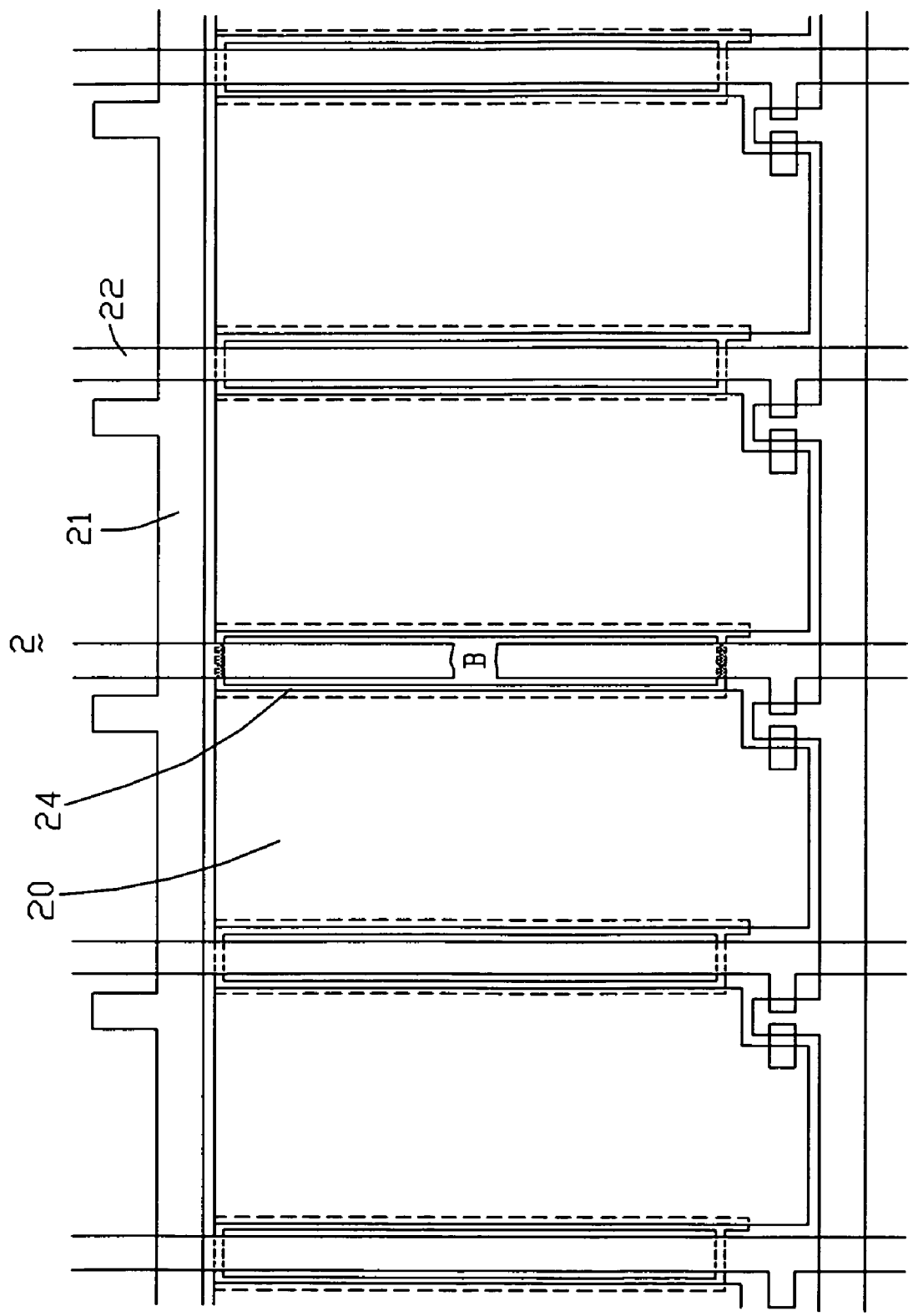
FIG. 2 is similar to FIG. 1, but showing line defect repairing of the LCD panel.

Referring to FIG. 2, a process for repairing line defects of wiring patterns of the LCD panel 2 is described as below. When a broken point B is detected to interrupt image signals passing through the data line 22, a corresponding repair line 24 is selected, and then the broken data line 22 and the repair line 24 are connected by laser fusing or other conventional techniques at their two intersection points (not labeled). Thus, the data line 22 is electrically connected to the repair line 24, this broken segment of the data line 22 can be replaced by the repair line 24, and the image signals can pass through the data line 22 by detouring around the broken point B.

In summary, the repair lines 24 cross the corresponding data lines 22 between each two corresponding adjacent pixel electrodes 20, respectively. If defects occur in the data lines 22, an adjacent, suitable repair line 24 can be chosen for repairing the defect by laser fusing to become an electrical loop. Thus, compared with the conventional LCD panel 1, the repair line 24 is disposed adjacent to the corresponding data lines 22 in display region of the LCD panel 2, a delay of the image signals passing through the repair line 24 of the LCD panel 2 is reduced or not incurred, and a quality of displaying images of the LCD panel 2 is not affected. In addition, the number of the repair lines 24 is not limited by the space and size of the LCD panel 2.

Furthermore, a similar line defect repairing configuration and method can be also used for repairing the gate lines 21.

Figure 3:
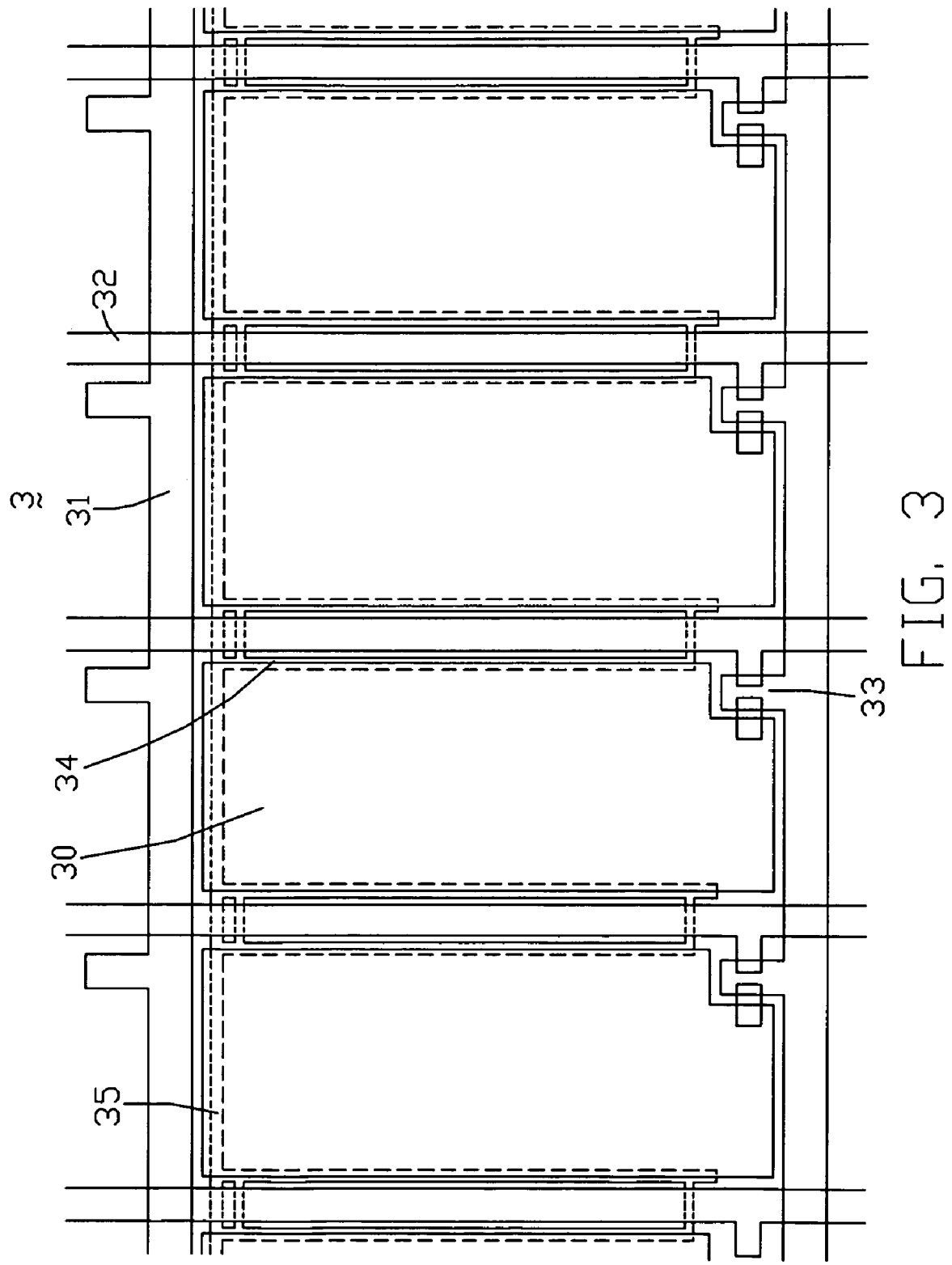
FIG. 3 is a schematic, top plan view of part of an LCD panel according to a second embodiment of the present invention, the LCD panel having a line defect repairing configuration.

Referring to FIG. 3, part of an LCD panel 3 according to a second embodiment of the present invention is shown. The LCD panel 3 includes a plurality of gate lines 31 that are parallel to each other, a plurality of data lines 32 that are parallel to each other and that cross the gate lines 31, a plurality of rectangular pixel regions (not labeled) each surrounded by respective pairs of crossing gate lines 31 and data lines 32, and a plurality of common lines 35. Each pixel region includes a TFT 33 and a pixel electrode 30. The common lines 35 are located in each pixel region for a display with a storage-capacitor-on-common ($C_{st}$-on-common).

In each horizontally row of pixel region, the common line 35 includes a common bus line (not labeled) and a plurality of sub common lines (not labeled). The common bus line is disposed adjacent to a corresponding gate line 31 and parallel to the corresponding gate line 31, and the sub common lines perpendicularly extend from the common bus line. Each two adjacent sub common lines contact respectively to each other at their front ends and tail ends to form a substantially rectangular-shaped ring as a repair line 34. The repair line 34 surrounds part of a corresponding data line 32 between two horizontally adjacent pixel electrodes 30, and crosses the corresponding data line 32 at two positions (not labeled) of the repair line 34. One position is at the front ends of the two adjacent sub common lines and adjacent to the corresponding common bus line, and the other is at the tail ends of the two adjacent sub common lines and adjacent to a source electrode (not labeled) of the corresponding TFT 33 connected to the corresponding data line 32. The two adjacent sub common lines are disposed at two sides of the corresponding data line 32, and may partly overlap edges of the two horizontally adjacent pixel electrodes 30, respectively. The common line 35 and the data lines 32 are formed on different planes, and an insulating layer is formed therebetween. The common line 35 and the two horizontally adjacent pixel electrodes 30 are also formed on different planes, and an insulating layer is also is formed therebetween. Thus, the repair lines 34 are electrically isolated from the data lines 32 and also the pixel electrodes 30.

Figure 4:
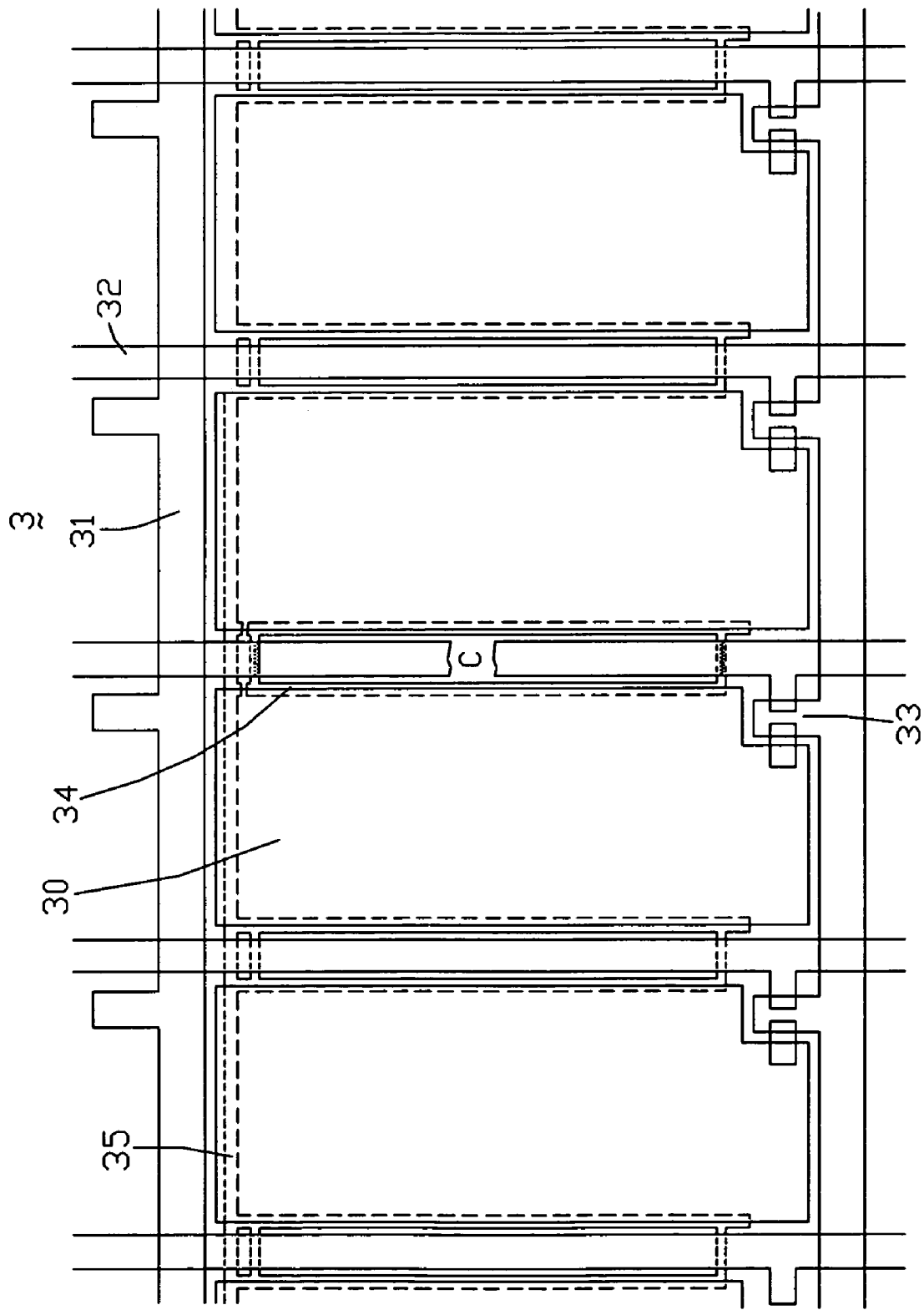
FIG. 4 is similar to FIG. 3, but showing line defect repairing of the LCD panel.
Figure 5:
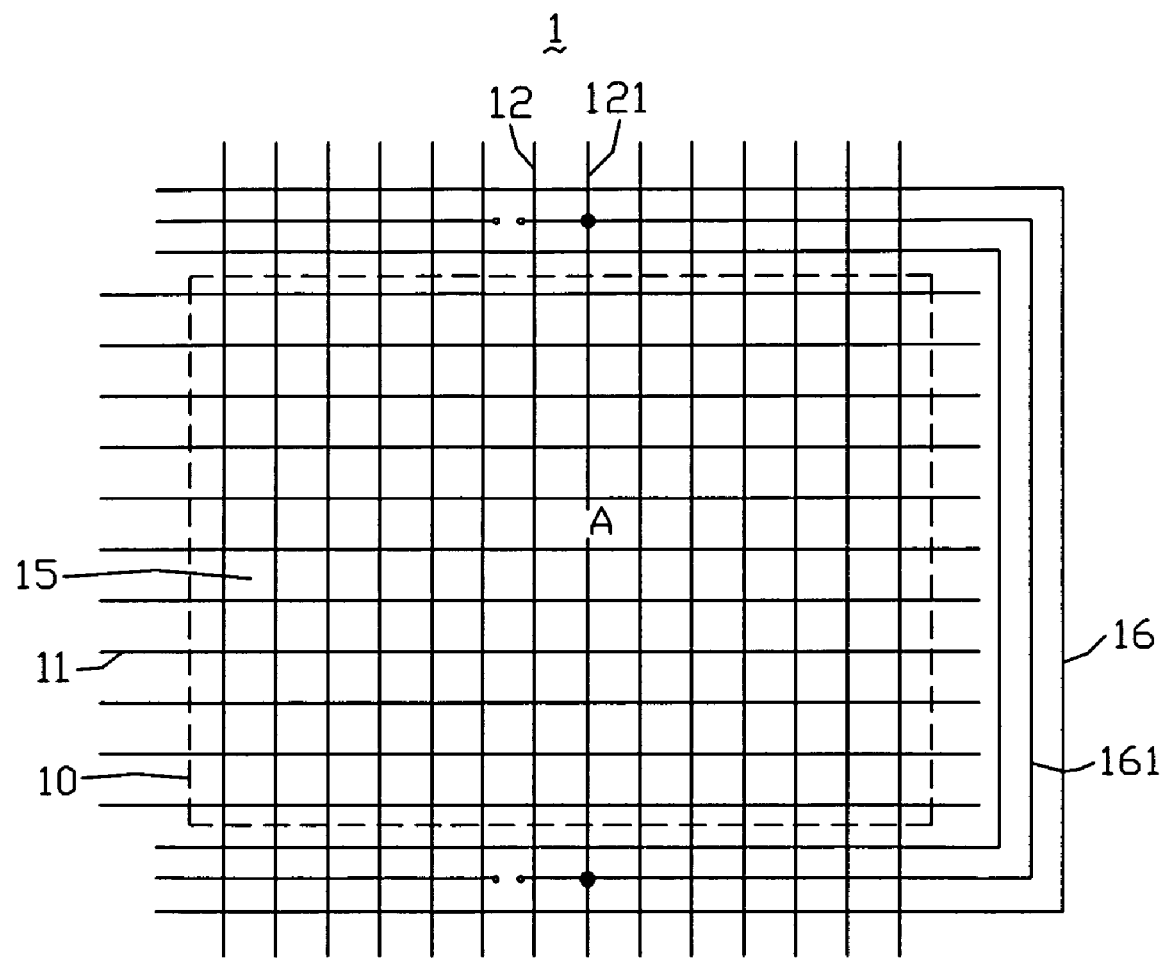
FIG. 5 is a schematic, top plan view of a conventional LCD panel, showing line defect repairing thereof.

Referring to FIG. 4, a process for repairing line defects of wiring patterns of the LCD panel 3 is described as follows. When a broken point C is detected to interrupt image signals passing through the broken data line 32, a corresponding repair line 34 is selected, and then the broken data line 32 and the repair line 34 are connected by laser fusing or other conventional techniques at their two intersection points (not labeled). Moreover, the repair line 34 is cut off from the corresponding common bus line. Thus, the data line 32 is electrically connected to the repair line 34, this broken segment of the data line 32 can be replaced by the repair line 34, and the image signals can pass through the data line 32 by detouring around the broken point C and not impact storage capacitors on the common bus line.

In summary, the repair lines 34 cross the corresponding data lines 32 between each two corresponding adjacent pixel electrodes 30, respectively. If defects occur in the data lines 32, an adjacent, suitable repair line 34 can be chosen for repairing the defect by laser fusing to become an electrical loop. Thus, compared with the conventional LCD panel 1, the repair line 34 is disposed adjacent to the corresponding data lines 32 in display region of the LCD panel 3, a delay of the image signals passing through the repair line 34 of the LCD panel 3 is reduced or not incurred, and a quality of displaying images of the LCD panel 3 is not affected. In addition, the number of the repair lines 34 is not limited by the space and size of the LCD panel 3.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display panel, comprising:
a plurality of gate lines that are parallel to each other;
a plurality of data lines that are parallel to each other and cross the gate lines;
a plurality of pixel regions, each pixel region surrounded by two corresponding gate lines and two corresponding data lines, and each pixel region comprising a pixel electrode; and
a plurality of common lines, wherein each common line comprises a common bus line and a plurality of sub common lines, the common bus line is parallel to the gate lines and disposed adjacent to a corresponding gate line, and the sub common lines perpendicularly extend from the common bus line;
wherein the sub common lines define a plurality of rectangular ring-shaped repair lines extending along the data lines, the repair lines and the data lines are formed on different planes of the liquid crystal display panel, each repair line is provided at a respective one of the pixel regions and defined by each two adjacent sub common lines, the two adjacent sub common lines contact each other at two positions to define two opposite short sides of the repair line, one position is at front ends of the two adjacent sub common lines and adjacent to a corresponding common bus line, the other position is at tail ends of the two adjacent sub common lines and adjacent to a next gate line, the two short sides cross a corresponding data line and the repair line is electrically isolated from the corresponding data line.

2. The liquid crystal display panel as claimed in claim 1, further comprising an insulating layer, wherein the insulating layer is formed between the repair lines and the data lines.

3. The liquid crystal display panel as claimed in claim 1, wherein the repair line is electrically isolated from the corresponding pixel electrode.

4. The liquid crystal display panel as claimed in claim 1, wherein each pixel region further comprises a thin film transistor, a source electrode of the thin film transistor of the respective one of the pixel regions being adjacent to the tail ends of the two adjacent sub common lines and being connected to the corresponding data line.

5. The liquid crystal display panel as claimed in claim 1, wherein the two adjacent sub common lines are disposed at two sides of the corresponding data line and between two adjacent gate lines.

6. The liquid crystal display panel as claimed in claim 5, wherein the two adjacent sub common lines partly overlap edges of the two adjacent pixel electrodes, respectively.

7. A repairing method for a liquid crystal display panel, the method comprising:
providing a liquid crystal display panel, the liquid crystal display panel comprising:
a plurality of gate lines that are parallel to each other;
a plurality of data lines that are parallel to each other;
a plurality of pixel regions surrounded by the crossed gate lines and data lines, each pixel region comprising a pixel electrode; and
a plurality of common lines, each common line comprising a common bus line and a plurality of sub common lines, the common bus line being parallel to the gate lines and disposed adjacent to a corresponding gate line, the sub common lines perpendicularly extending from the common bus line, the sub common lines defining a plurality of rectangular ring-shaped repair lines extending along the data lines, the repair lines and the data lines formed on different planes of the liquid crystal display panel, each repair line provided at a respective one of the pixel regions and defined by each two adjacent sub common lines, the two adjacent sub common lines contacting each other at two positions to define two opposite short sides of the repair line, one position being at front ends of the two adjacent sub common lines and adjacent to a corresponding common bus line, and the other position being at tail ends of the two adjacent sub common lines and adjacent to a next gate line, the two short sides crossing a corresponding data line, and the repair line being electrically isolated from the corresponding data line;
inspecting the liquid crystal display panel;
in the event of a defect being detected in a data line, selecting the repair line adjacent to the data line; and
electrically connecting the data line and the repair line at the two positions where the data line crosses the repair line.

8. The repairing method as claimed in claim 7, wherein the data line and the repair line are electrically connected by laser fusing.

9. The repairing method as claimed in claim 8, wherein after electrically connecting the data line and the repair line, the repair line is cut off from the corresponding common bus line.

10. The repairing method as claimed in claim 7, wherein each pixel region further comprises a thin film transistor, a source electrode of the thin film transistor of the respective one of the pixel regions being adjacent to the tail ends of the two adjacent sub common lines and being connected to the corresponding data line.

11. A liquid crystal display panel, comprising:
a plurality of gate lines that are parallel to each other;
a plurality of data lines that are parallel to each other and cross the gate lines; and
a plurality of common lines, each common line comprising a common bus line and a plurality of sub common lines, the common bus line being parallel to the gate lines and disposed adjacent to a corresponding gate line, and the sub common lines perpendicularly extending from the common bus line;
wherein each two adjacent sub common lines contact each other at two contacting positions to define a substantially rectangular ring-shaped repair line, one contacting position crossing a corresponding data line at front ends of the two adjacent sub common lines adjacent to a corresponding common bus line, and the other contacting position crossing the corresponding data line at tail ends of the two adjacent sub common lines far from the corresponding common bus line.

12. The liquid crystal display panel as claimed in claim 11, wherein the gate lines and the data lines defines a plurality of pixel regions, and each repair line is provided at a respective pixel region and overlaps the corresponding data line.

13. The liquid crystal display panel as claimed in claim 12, wherein each pixel region comprises a thin film transistor provided at a corner of the pixel region, and the thin film transistor is adjacent to the tail ends of the two adjacent sub common lines forming the repair line corresponding to the pixel region.

14. The liquid crystal display panel as claimed in claim 11, wherein the two adjacent sub common lines are disposed at two sides of the corresponding data line and between two adjacent gate lines.

15. The liquid crystal display panel as claimed in claim 11, wherein the two adjacent sub common lines partly overlap edges of the two adjacent pixel electrodes, respectively.

* * * * *